Sept. 29, 1942.　　　C. W. ATTWOOD　　　2,297,279
DUCT-ENCLOSED BUS STRUCTURE
Filed Aug. 18, 1939　　　2 Sheets-Sheet 1

INVENTOR.
CHARLES W. ATTWOOD
BY
ATTORNEYS

Sept. 29, 1942.　　　C. W. ATTWOOD　　　2,297,279
DUCT-ENCLOSED BUS STRUCTURE
Filed Aug. 18, 1939　　　2 Sheets-Sheet 2
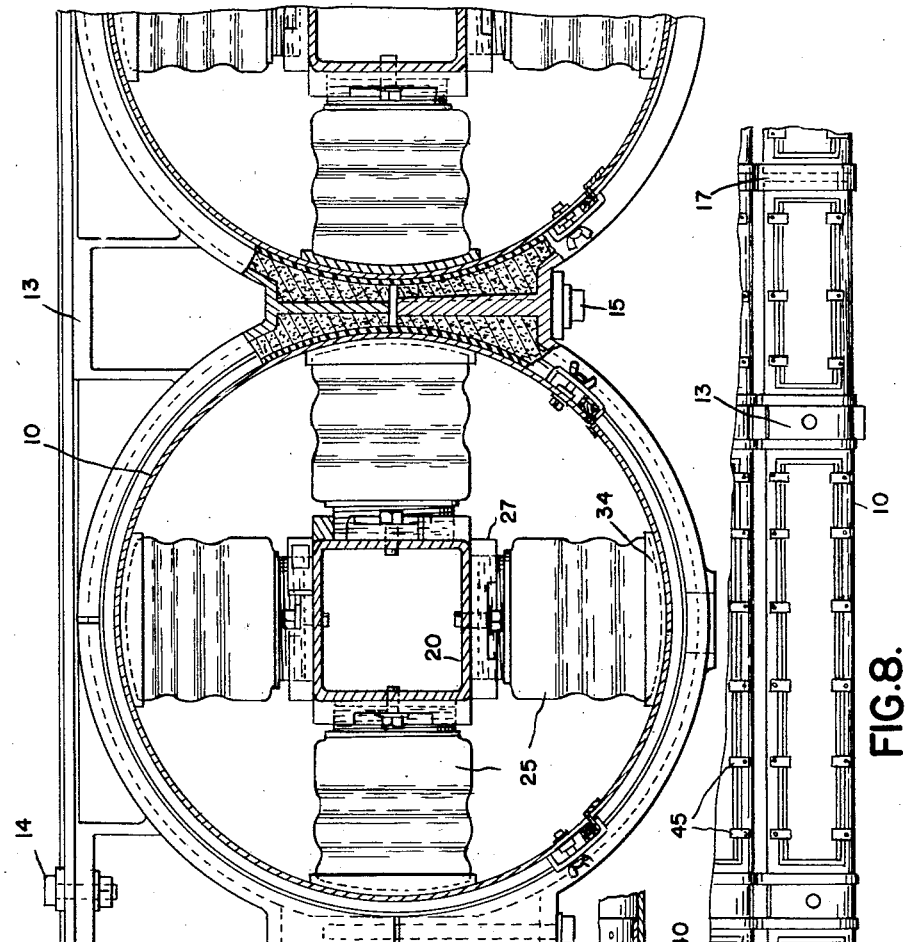
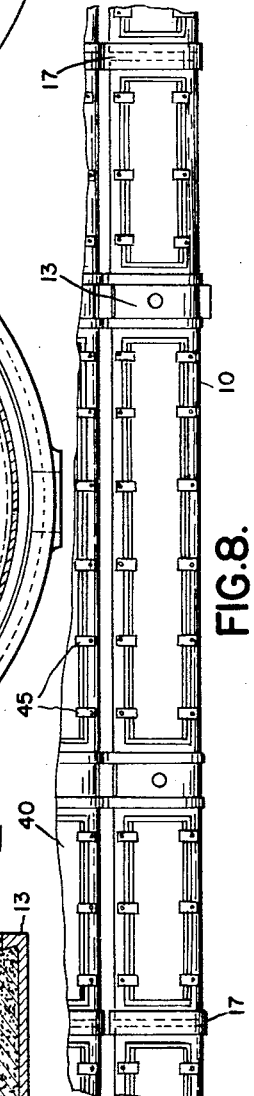
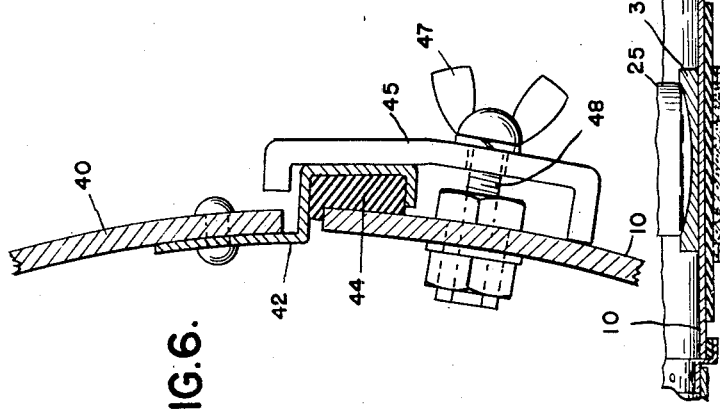
INVENTOR.
CHARLES W. ATTWOOD
BY
ATTORNEYS Patented Sept. 29, 1942

2,297,279

UNITED STATES PATENT OFFICE 2,297,279

DUCT-ENCLOSED BUS STRUCTURE

Charles W. Attwood, Detroit, Mich.

Application August 18, 1939, Serial No. 290,883

6 Claims. (Cl. 174—99)

This invention relates to bus bar and duct constructions, for conveying heavy currents of electricity. An important object of the invention is to provide an improved bus and duct construction in which the duct is formed of tubular sections, through which the bus extends in axial position, the bus itself also being formed in sections, and supported by means of radially disposed insulators fixedly secured to the bus, but slidable and rockable in the duct, to provide means whereby the bus may move in response to temperature changes, as well as under magnetically induced stresses which may arise during short circuit or other overload conditions.

Still another object is to provide in conjunction with a cylindrical bus casing or duct assembly, an integrated bus and insulator assembly rotatable in the casing, so arranged as to enable any desired one of the radially mounted insulators to be moved to the front, where access thereto, for adjustment or replacement, may be afforded through suitably positioned doors.

A further object is to provide in conjunction with such radially disposed insulators and tubular duct, improved means for transmitting the physical load from the insulators to the duct, and to the supporting means for the latter, which load transmitting means is so arranged that although the insulators are rockable in all directions with respect to the duct, the load is always distributed over relatively large areas, and undue stresses prevented. A further and related object is to so mount the insulators with respect to the duct and the bus as to eliminate bending stresses upon the insulators, in an improved and very simple manner.

Other objects and advantages will be apparent from the following description, wherein reference is made to the accompanying drawings illustrating a preferred embodiment of my invention and wherein similar reference numerals designate similar parts throughout the several views.

In the drawings:

Figure 2 is a cross section taken substantially on the line 2—2 of Figure 1.

Figure 1:
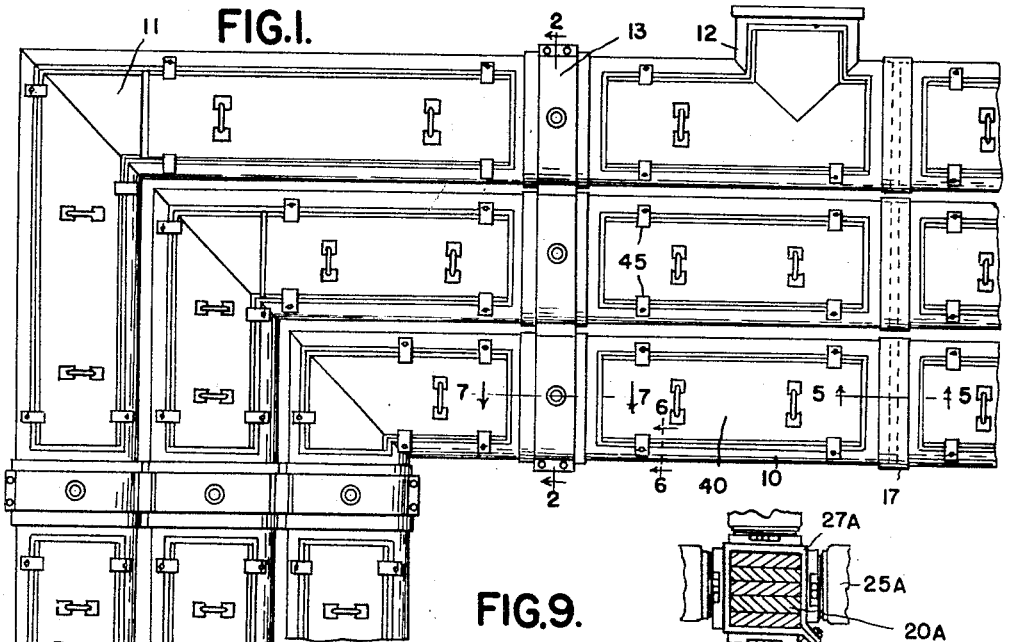
Figure 1 is an elevational view of a multiple duct-enclosed bus installation constructed in accordance with the present invention.
Figure 5:
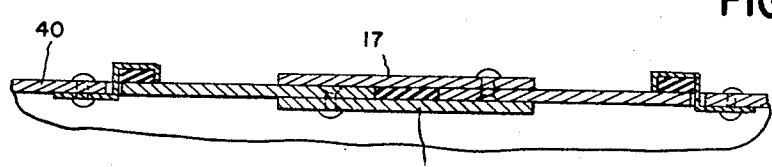
Figure 4:
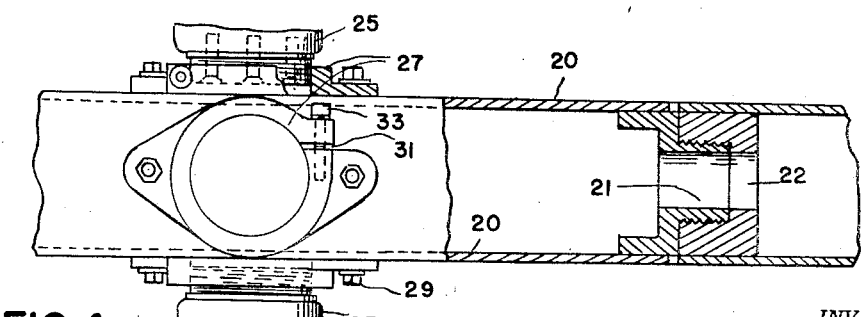
Figure 4 is a view, partly in side elevation and partly in substantially central cross section, of the current conducting bus bar, fragmentarily showing a group of supporting insulators.

Figures 5, 6 and 7 are sectional details taken substantially on the lines 5—5, 6—6, and 7—7, respectively, of Figure 1, and looking in the direction of the arrows.

Figure 9:
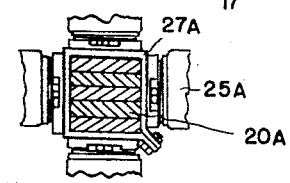

Figure 8 is an elevational view on a smaller scale showing a plurality of units in assembled relation; and Figure 9 is a fragmentary side elevational view showing a somewhat modified bus construction.

Referring now to the drawings.

It will be seen that the tubular bus duct or housing is formed in standardized sections, as 10. These are preferably of aluminum or other suitable non-magnetic sheet metal, or of plastic, in which event they may be transparent. The straight tubes may be supplemented by elbows 11, T's 12, and the like, which allow the duct work to be carried in any desired direction. At appropriately spaced intervals the duct sections are supported by brackets 13, which are bolted or otherwise suitably secured to the building framework, as 14, or other supporting structure. Each bracket it formed in two complementary sections, shaped to encircle the duct, the two parts being held together by cap screws 15 which, when tightened, clamp the duct tightly in place. The brackets are preferably so placed that the ends of the duct sections meet at intermediate points rather than at the brackets. At such intermediate points coupling sleeves 17, 18 are provided, one carried by each bus section, and slidable to accommodate expansion and contraction of the sections.

The bus 20 is also formed in separable sections, and is preferably of square hollow form. Solid bus may of course be used if desired, and if formed in a plurality of sections these are secured by clamping elements 27A (Figure 9) which also carry the insulators. At opposite ends each bus section is provided with cooperating screw threaded coupling elements 21, 22. These will be seen to permit ready assembly and disassembly of the bus sections.

The bus is supported in axial position in the duct by means of stand-off insulators 25, mounted in clamp-brackets 27. Each of the bracket members 27 is bolted or otherwise rigidly secured to the bus. The brackets are threaded and split, as indicated at 31, and each insulator has a threaded adaptor fastened to its end and screwed into the clamp-bracket. This arrangement will be seen to permit adjustment of the insulator in and out when the clamping screw 33 is loosened, while when such screw is tightened, the insulator is firmly held. Such arrangement also enables ready removal and replacement of insulators. The outer end of each insulator is of partly spherical form, and is preferably provided with a metal cap 34, having a similarly shaped interior and rockable upon the end of the insulator. The outer surface of the cap is partly cylindrical, and conforms to the interior of the duct, the cap being unattached to the duct, however, so that it may slide longitudinally therein. The supporting insulators are arranged in groups, four being shown in each group in the drawings, although this is subject to variation. One such group is preferably located within and in aligned relation with each of the duct-supporting brackets 15, so that the load is directly transferred to such supports, and no bending stresses are applied to the duct. The radial adjustment of the insulator permitted by their threaded mounting in the clamp brackets 27 allows all vibrations and looseness to be taken up.

In the front face of each duct section a relatively large opening is formed, adapted to be closed by a removable cover 40. A gasket-retaining channel 42 encircles the edge of each cover, and the gasket material 44 therein is adapted to be pressed against the margins of the opening when the cover is in place, to seal such opening. The retaining means for the cover is shown as comprising a plurality of sheet metal clamps 45, adapted to bear against the outer surface of the gasket retainer, each clamping element being retained by a wing nut 47 screwed on a clamping screw 48 mounted in the duct.

Figure 3:
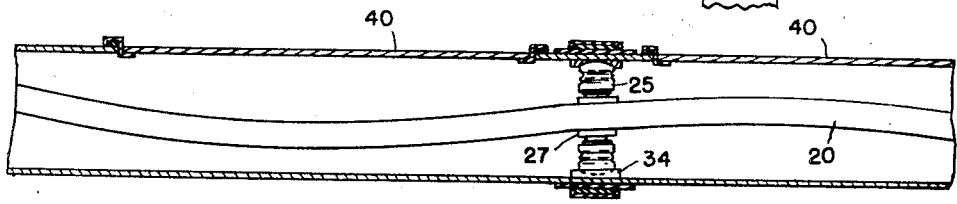
Figure 3 is a substantially central longitudinal section of one of the enclosed bus assemblies, a portion of the bus being shown in the bowed shape it might assume under the action of forces created during overload.

As shown in Figure 3, in event great increase of electromagnetic field, due to short circuit or other overload conditions, should cause vibration or stress of the bus to such extent as to bow it out of its normal axial position, the insulators may rock on their ball-shaped caps, to permit such movement, without imposition of bending stressed upon the insulators themselves.

In event of failure of an insulator, removal and replacement thereof is greatly facilitated by the fact that they are secured to the bus, and rotatable therewith in the casing. Since the bus sections are individually rotatable, by reason of the provision of the nipple-type couplings at their ends, it is only necessary, after removal of the proper inspection cover, to rotate the bus assembly until the defective insulator is brought to the front, where it may be easily removed and replaced.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In combination with a substantially cylindrical duct, a bus formed in separable sections extending substantially axially therethrough, said sections being rotatable with relation to each other, and means for supporting the bus in the duct, comprising combined insulating and supporting devices affixed to individual bus sections and extending outwardly therefrom to engage the interior of the duct and having outer end portions abutting and adapted to be supported by the interior of the duct, at least a part of each of said devices being curved about a radius not exceeding that of the interior of the duct and unsecured to said duct, whereby said insulating devices are rockable and slidable with respect to the interior of the duct and rotatable therewithin about the axis of the bus.

2. In combination with a tubular duct structure having a plurality of openings in one face thereof, a bus assembly extending substantially axially through said duct structure, and formed in sections individually rotatable about a longitudinal axis, means for supporting said bus assembly in the duct srtucture, comprising a plurality of combined insulating and supporting structures fixedly secured to the bus assembly and extending radially therefrom and grouped substantially at each of a plurality of common points, in positions to be accessible through said openings, said structures being in engagement with the interior of the duct structure but rockable and slidable along the interior of the latter and rotatable with the bus, about the axis thereof, to facilitate access to said insulating and supporting structure through said openings.

3. Means as set forth in claim 2 including coupling means connecting said sections of the duct structure, said coupling means and the duct structure being hollow, to form a continuous passage therethrough.

4. In combination with a substantially cylindrical duct, a bus extending substantially axially therethrough, and means for supporting the bus in the duct, comprising combined insulating and supporting devices affixed to the bus and extending outwardly therefrom, each of said devices comprising an insulator, at least one insulator being attached to each side of the bus, the insulators being spaced at suitable intervals and arranged to maintain the bus in desired position within and spaced from the walls of the duct, each insulator having a substantially spherical outer end portion and a cap having a seat shaped conformably to said end portion and rotatably fitted upon the same, an outer portion of said cap being of partly cylindrical contour, shaped conformably to and slidable within the interior of the duct, whereby said devices and the bus carried thereby are rockable and longitudinally slidable with respect to the interior of the duct.

5. In combination with a substantially cylindrical duct, a bus extending substantially axially therethrough, and means for supporting the bus in the duct, comprising combined insulating and supporting devices affixed to the bus and extending outwardly therefrom, said devices having outer end portions abutting and adapted to be supported by the interior of the duct, at least a part of each of said devices being transversely curved upon a radius not exceeding that of the interior of the duct, the end portions being unsecured to said duct, means for attaching one of said combined insulating and supporting devices to each side of the bus at suitable intervals to maintain the bus in desired position within and spaced from the walls of the duct, said attaching means comprising a threaded and split holding element, the inner extremity of each such device being correspondingly threaded and fitted thereinto, whereby the degree of projection of each may be adjusted by rotation, and means for clamping the split portion of said element to rigidly hold said device against movement with respect to the bus.

6. In combination with a substantially cylindrical duct, a bus extending substantially axially therethrough, and means for supporting the bus in the duct, comprising combined insulating and supporting devices affixed to the bus and extending outwardly therefrom, a plurality of circular supports encircling and carrying said duct at spaced intervals, said combined insulating and supporting devices being arranged in corradiating groups substantially aligned with said supports, removable hatches in said duct between and adjacent said supports, the bus and said devices being rotatable in the duct about the axis of the bus, whereby desired ones of said devices may be moved toward and from said hatches.

CHARLES W. ATTWOOD.